United States Patent
Kharkar et al.

(10) Patent No.: US 9,560,131 B2
(45) Date of Patent: Jan. 31, 2017

(54) EFFICIENT SYNCHRONIZATION OF BEHAVIOR TREES USING NETWORK SIGNIFICANT NODES

(71) Applicant: Disney Enterprises, Inc., Burbank, CA (US)

(72) Inventors: Sandeep V. Kharkar, Bountiful, UT (US); Andrew Cantlay Marre, Montreal (CA); Kirk Baum, American Fork, UT (US); Jaren J. Peterson, Layton, UT (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 451 days.

(21) Appl. No.: 13/918,874

(22) Filed: Jun. 14, 2013

(65) Prior Publication Data

US 2014/0372554 A1 Dec. 18, 2014

(51) Int. Cl.
*H04L 29/08* (2006.01)
*H04L 29/06* (2006.01)
*A63F 13/358* (2014.01)

(52) U.S. Cl.
CPC ......... *H04L 67/1095* (2013.01); *A63F 13/358* (2014.09); *H04L 67/38* (2013.01); *A63F 2300/5593* (2013.01); *A63F 2300/638* (2013.01)

(58) Field of Classification Search
CPC .......... H04L 1/00; H04L 7/00; H04L 2203/00; H04L 67/02; H04L 67/10; H04L 67/06; H04L 67/32; H04L 67/1095; H04L 67/38; G06F 11/1096; G06F 17/30864; G06F 17/30174; G06F 17/30905; G06F 17/30876; G06F 11/0766; G06F 11/004; G06F 11/0709; G06F 11/0724; G06F 17/2247; G06F 9/32; G06F 3/04817; G06F 3/048; H04W 4/02; H04W 4/001; H04W 4/008; H04W 4/00; H04W 4/003; H04W 4/18; A63F 13/358; A63F 2300/5593; A63F 2300/638
USPC ....... 709/217, 201, 203, 219, 229, 227, 248; 715/757; 718/100
See application file for complete search history.

(56) References Cited

U.S. PATENT DOCUMENTS

| | | | | |
|---|---|---|---|---|
| 6,122,664 | A * | 9/2000 | Boukobza et al. | 709/224 |
| 7,433,953 | B1 * | 10/2008 | Kappler et al. | 709/226 |
| 7,552,438 | B1 * | 6/2009 | Werme et al. | 718/104 |
| 8,060,389 | B2 * | 11/2011 | Johnson | 705/6 |
| 8,327,028 | B1 * | 12/2012 | Shah et al. | 709/248 |
| 8,775,282 | B1 * | 7/2014 | Ward et al. | 705/34 |
| 8,826,032 | B1 * | 9/2014 | Yahalom | H04L 43/0817 713/187 |

(Continued)

*Primary Examiner* — David Lazaro
*Assistant Examiner* — Berhanu Shitayewoldetsadi
(74) *Attorney, Agent, or Firm* — Sheppard Mullin Richter & Hampton LLP

(57) ABSTRACT

Objects in a virtual space may need to be synchronized between different instances (or different expressions of an instance) of the virtual space that are separated spatially. Objects include characters. Different expressions may be associated with different users and different client computing platforms that are connected by a network. The actions of the same character in two expressions of the same instance of the virtual space may not be synchronized due to network delay, lag, latency, or other delays, or due to joining a session already in progress. Responsive to a determination that an object is not synchronized, a sequence of subsequent states is determined that will result in the object being synchronized.

20 Claims, 3 Drawing Sheets

(56) References Cited

U.S. PATENT DOCUMENTS

| | | | |
|---|---|---|---|
| 8,984,059 B2* | 3/2015 | Johnson | 709/203 |
| 2002/0194287 A1* | 12/2002 | Tyra et al. | 709/206 |
| 2004/0003078 A1* | 1/2004 | Todd et al. | 709/224 |
| 2005/0050438 A1* | 3/2005 | Cheung | G06F 9/4446 715/206 |
| 2006/0148545 A1* | 7/2006 | Rhyne | A63F 13/00 463/1 |
| 2006/0294136 A1* | 12/2006 | Wu | G06F 9/4428 |
| 2007/0094358 A1* | 4/2007 | Uchida et al. | 709/219 |
| 2008/0102955 A1* | 5/2008 | D'Amora | A63F 13/12 463/42 |
| 2009/0031006 A1* | 1/2009 | Johnson | 709/218 |
| 2009/0077158 A1* | 3/2009 | Riley | G06Q 30/0277 709/202 |
| 2010/0241994 A1* | 9/2010 | Wiley | G06F 3/04842 715/832 |
| 2010/0278449 A1* | 11/2010 | Gitlin | G06T 3/4007 382/277 |
| 2011/0107379 A1* | 5/2011 | Lajoie et al. | 725/87 |
| 2011/0271198 A1* | 11/2011 | Brakensiek et al. | 715/744 |
| 2012/0094751 A1* | 4/2012 | Reynolds | A63F 13/12 463/29 |
| 2012/0311463 A1* | 12/2012 | Hickman | G06T 19/00 715/757 |

* cited by examiner

EFFICIENT SYNCHRONIZATION OF BEHAVIOR TREES USING NETWORK SIGNIFICANT NODES

FIELD OF THE DISCLOSURE

This disclosure relates to synchronizing objects, including characters, across different (expressions of) instances of a virtual space.

BACKGROUND

Conventionally, in a multi-character networked game, actions by different characters need to be synchronized across different instances of the game. Behavior trees may be used to implement behavior and/or action of characters in a game. Complex characters may have deep and/or wide behavior trees including many nodes. Multiple instances of the game may need to share updated information, e.g. one or more currently active nodes per character, with each other and/or a server that hosts the game. Faithful replication of all characters in every instance of the game may require sharing a lot of information over the network. Alternatively, and/or simultaneously, allowing characters to be out of sync may cause poor interaction within the game, poor animation of actions, and/or other visually underwhelming effects.

Existing solutions may require hard coding on a case-by-case basis. Networking may be implemented in a very literal manner with large amounts of network traffic being dedicated to updating characters in different locations and sharing information about the current state of the characters including but not limited to animations that are being played on the characters, their current destination of travel, their current mode of transport, attack targets, interactions with other characters, etc. The network implementation of characters may require extrapolating to make educated guesses about where the master character is at a given moment and what animation is playing at what frame. As such, existing approaches may be very inflexible and unforgiving making for very choppy looking characters and/or interactions.

SUMMARY

One aspect of the disclosure relates to a system configured to synchronize objects in a virtual space. The virtual space may be hosted by a server. The virtual space may implement a networked game. The server may implement one or more instances of the virtual space. One of more users may interact with each other and an instance of the virtual space through individual expressions of the instance of the virtual space. Expressions may be implemented by client computing platforms and/or the server. Individual client computing platforms may implement individual expressions. Individual client computing platforms may interact and/or communicate with the server over one or more networks. Client computing platforms may be associated with users. Individual client computing platforms may be associated with individual users. Users may interact with expressions of an instance of the virtual space through client computing platforms. Individual users may interact with individual expressions of the instance of the virtual space. The expressions of an instance of the virtual space and the instance that is hosted by the server may be jointly referred to as implementations of the virtual space.

The virtual space may include objects. Objects may include characters and/or other objects. As used herein, the terms character and object may be used interchangeably. Objects may be controlled through an individual expression, e.g. by an individual user using an individual client computing platform, by artificial intelligence (AI), by the instance of the virtual space that is hosted by the server, by testing resources, by other components of the virtual space, and/or any combination thereof. The controlling entity of an object may be referred to as the point of control. The object controlled at the point of control may be referred to as the master object. For example, some objects may be controlled by artificial intelligence during a first period (also referred to as AI-controlled), and user-controlled during a second period. Interacting objects may be controlled in different ways, for example by two different users, virtual users, and/or by non-player characters (NPC). Control of an object may migrate between different controlling entities. In other words, the point of control need not be fixed, but may move, for example from one client computing platform to another client computing platform. For example, if a particular user is interacting with a particular NPC, the point of control for that NPC may migrate to the same client computing platform used as the point of control for the character that represents that particular user.

Behavior and/or action of objects may be implemented using behavior trees. By way of non-limiting example, behavior and/or action may include may include one or more of locomotion of an object, a gesture performable by an object, a field of view of a character, a bodily motion of an object, actions performable by an object, equipping an object with a tool and/or weapon, using an equipped tool and/or weapon, initiating an interaction (e.g., coupling) between an object and another object, playing audio and/or visual effects associated with an action performed by an object, and/or other actions.

Behavior trees may include nodes that correspond to different states of the objects and/or different states of actions or behavior of objects. As used herein, the terms "node" and "state" and their derivatives may be used interchangeably when referring to behavior trees. Behavior trees may include edges that correspond to transitions between nodes. An individual behavior tree may be used for an individual object. A complex action for an object may be implemented by a sequence of nodes within a behavior tree. For example, when a character performs a jump, such an action may be implemented by a sequence of nodes going from lift-off, via hang-time, to landing. A sequence may include one or more transitions between different nodes. A transition from a first node to a second node may be referred to as an edge. For complex objects, multiple components may act (at least somewhat) independently. For example, the legs, torso, arms, and head of a character may have a range of possible motions/actions during a particular action such as a jump. Arms could flail, hold a weapon, reload, cast a spell, etc. The head could tilt in different directions, have different expressions, etc. The landing may be standing up straight, crouching, rolling, etc. In some embodiments, an object may have multiple concurrently active nodes within a behavior tree such that individual nodes correspond to different components within the object. Within a sequence of nodes, some nodes may be more significant than other nodes. For example, the first node of a particular action, such as a jump, may contain all or much of the information needed to determine important aspects of the action, such as the expected location of a character after the jump is completed. As a result, intermediate nodes between the first node and the last node of a particular action may be less significant than the first node.

As objects become increasingly more complex, their behavior trees may grow correspondingly. The required volume for storage and the required bandwidth for transfer (across one or more networks) of behavior trees may increase as behavior trees grow in size, complexity, and/or number. Bandwidth requirements may become a bottleneck or chokepoint for the operation of the system and/or the networked game.

Within an instance of the virtual space, objects may need to be synchronized across one or more networks. As used herein, a synchronized object is referred to as being "in-sync," whereas the opposite condition may be referred to as "out-of-sync." The behavior of an object may need to be shared between the point of control (or points of control) and one or more other implementations of the virtual space. Through such synchronization and/or sharing, actions within the virtual space occur substantially at the same time across multiple implementations of the virtual space. Substantially at the same time may be interpreted as within about 0.05 second, about 0.1 second, about 0.5 second, about 1 second, about 2 seconds, and/or about another span of time such that interaction and/or gameplay is not materially affected for the involved players. To illustrate interactions involving multiple points of control, direction of travel of a vehicle carrying two user-controlled characters may be controlled by a first user, a weapon mounted on the vehicle may be controlled by the second user, and reactions to terrain may be controlled by artificial intelligence.

A possible approach to synchronization may be to broadcast the currently active one or more nodes within the behavior trees for individual objects from their point of control to all other implementations of the virtual space. Such a broadcast may be performed, e.g., whenever any change or transition occurs within any of the behavior trees, after every displayed frame, and/or at other moments. Such an approach may likely be prohibitive for various reasons, including but not limited to the bandwidth and/or storage requirements for moderate sets of objects of moderate complexity. As used herein, a broadcast of information from one implementations of the virtual space to one or more implementations of the virtual space may be referred to as sharing of information.

In some embodiments, the system may include one or more servers. The server(s) may be configured to communicate with one or more client computing platforms according to a client/server architecture. In some embodiments, the system may be configured to provide communication between client computing platforms according to a peer-to-peer architecture. The users may access the system and/or the virtual space via client computing platform(s).

The server(s) may be configured to execute one or more computer program modules. The computer program modules may include one or more of a virtual space module, a user account module, an interface module, a transceiver module, and/or other modules. The user account module may be configured to access and/or manage one or more user profiles and/or user information associated with users of the system. The virtual space module may be configured to implement one or more instances of the virtual space executed by the computer modules to determine views of the virtual space. The interface module may be configured to generate and/or determine user interfaces for presentation to users. The transceiver module may be configured to share and/or synchronize actions and/or behavior of objects between implementations of the virtual space. The system could, at least in theory, synchronize actions and/or behavior of objects between implementations of the virtual space by sharing a full copy of each implementation's information with all other implementations. Practical limits prohibit such an approach, including, e.g., limits pertaining to computing power, required storage, and/or required bandwidth.

In some embodiments, a complete behavior tree for an object (including one or more concurrently active nodes), as well as any information needed to recreate how the master object arrived at its current position, may be shared over the network. Depending on the depth and complexity of the object, the number of objects in the virtual space (or in the current view of the virtual space), and the number of concurrent users and/or points of control, this approach may not be feasible.

To alleviate problems associated with previously described approaches, the system may be configured to explicitly share some information and not share other information. Shared information may include currently active significant nodes and/or information needed to recreate how the master object arrived at its current position. This information may be stored in (or associated with) edges of behavior trees. The edges that include such information may be referred to as significant edges. In other words, shared information may include significant nodes and significant edges.

By sharing less information, less bandwidth may be required. The system may be configured to rely on local implementations of individual expressions of an instance of the virtual space, being executed locally on individual client computing platforms. The system may be configured to extrapolate and/or determine actions and/or behavior of objects within the local implementations. The system may balance the sharing of information (by implementations of the virtual space) with locally determined information. Objects may be more likely to become out-of-sync as the quantity of shared information (and thus the required bandwidth) is reduced. Conversely, objects may be less likely to become out-of-sync as the quantity of shared information (and thus the required bandwidth) is increased.

Regardless of the approach to synchronization, some types of causes of synchronization problems, including but not limited to network delay, may be unavoidable. For example, when a user joins a game in progress, an object representing the user (or controlled by the user) may by definition be out-of-sync from the perspective of other implementations of the virtual space. Additionally, all objects in the virtual space of the new user's instance and/or station would be in their default state, and thus out of sync with the rest of the virtual space. The system may be configured to determine whether objects are out-of-sync and remedy such a situation.

The client computing platforms may include electronic storage. The client computing platforms may be configured to execute one or more computer program modules. The computer program modules may include one or more of a space module, a reception module, a behavior module, a synchronization module, a sequence module, and/or other modules.

The electronic storage may be configured to store behavior trees for objects in a virtual space. Behavior trees may include nodes that correspond to states of objects, edges that correspond to transitions between nodes, and/or other information. Individual behavior trees may correspond to individual objects.

The space module may be configured to implement an expression of an instance of the virtual space. The space module may be configured to determine views of the virtual space. In some embodiments, the space module of a client computing platform may communicate with one or more modules of the server that hosts an instance of the virtual space. By way of non-limiting example, the space module may communicate and/or interact with the virtual space module of a server.

The reception module may be configured to receive shared information over one or more networks. For example, the reception module may be configured to receive current states for objects, as well as information needed to recreate how an object arrived at its current position. As used herein, the term "received current states" may interchangeably be referred to as "received states" or "shared states". Received current states of objects may originate from (e.g. be shared by) one or more points of control. In some implementations, shared states correspond to significant (and currently active) nodes in the behavior tree of an object. The reception module may receive a current state for a first object from, e.g., the server that hosts an instance of the virtual space. The reception module may receive a current state for a second object from, e.g., a client computing platform that implements an expression of the instance of the virtual space. In some embodiments, communication between different client computing platforms may be directed through a server. In some implementations, e.g. when using a peer-to-peer architecture, such communication may occur through a point-to-point connection between the client computing platforms.

The behavior module may be configured to determine subsequent states of objects. In some implementations, determined states correspond to non-significant nodes in the behavior tree of an object. The behavior module may be configured to determine subsequent nodes within individual behavior trees for individual objects. Determinations by the behavior module may be based on shared information, e.g. received states or other received information. Alternatively, and/or simultaneously, determinations by the behavior module may be based on the behavior trees of the objects, and/or other information. In some embodiments, actions of objects may be implemented as predetermined sequences of nodes and/or states. For example, individual actions may correspond to traversals spanning multiple nodes of individual behavior trees.

The synchronization module may be configured to synchronize states of objects that are locally determined (by a particular client computing platform) with the received states for those objects, as shared by one or more points of control. In other words, the synchronization module synchronizes determined states with received states. In doing so, the synchronization module may be configured to determine whether objects of an expression of an instance of the virtual space are up-to-date in comparison to counterparts of the objects in other implementations of the virtual space.

The sequence module may be configured to determine a sequence of one or more subsequent states for an object. Operation of the sequence module may be responsive to a determination that an object is not synchronized. The determined sequence may be such that at the end of the sequence the object will be synchronized with one or more other objects as appropriate.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
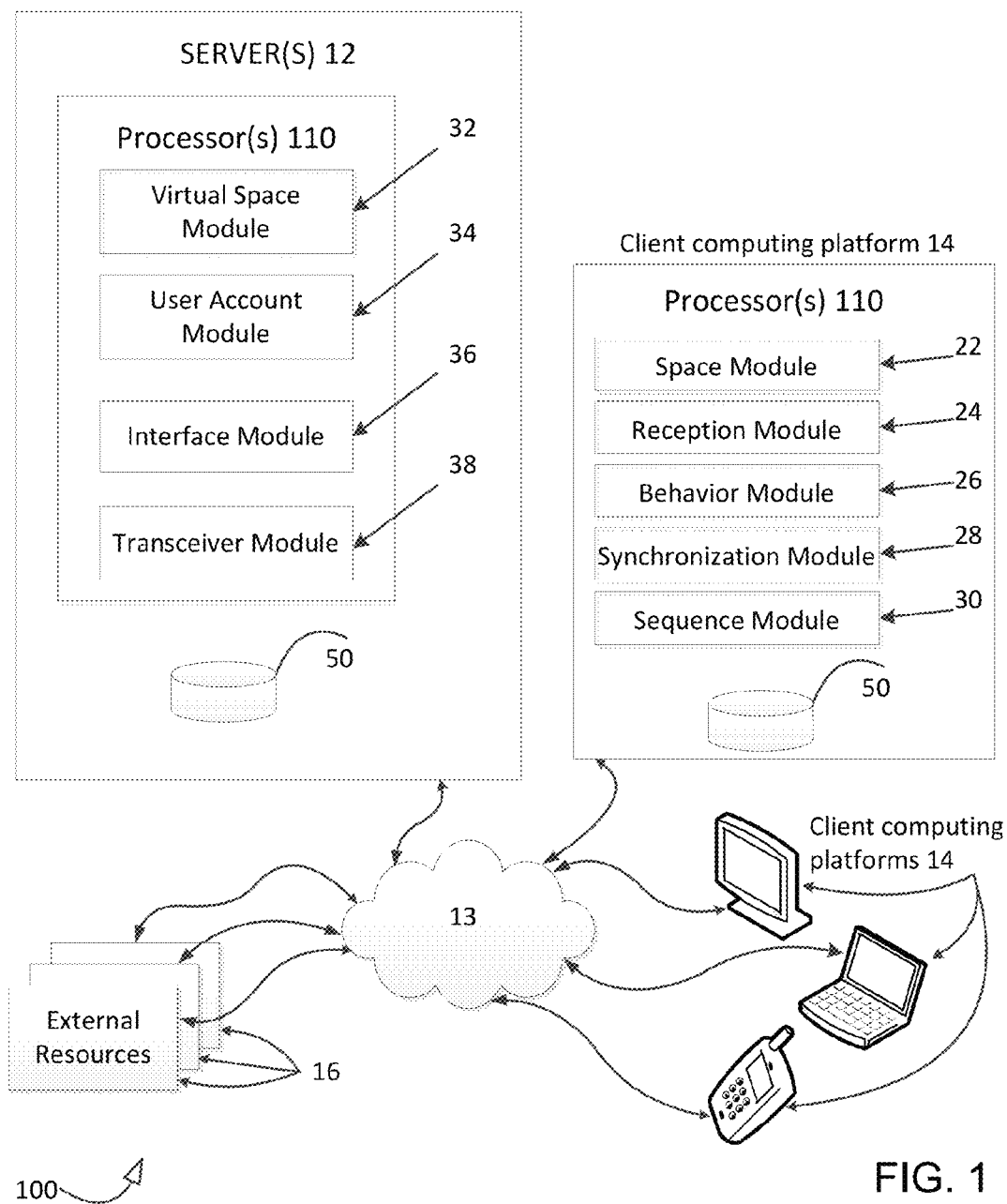
FIG. 1 illustrates a system configured to synchronize objects in a virtual space, in accordance with one or more embodiments.

FIG. 1 illustrates a system 100 configured to synchronize objects in a virtual space, in accordance with one or more embodiments. The virtual space may implement a networked game. In some embodiments, system 100 may include one or more servers 12, one or more client computing platforms 14, and/or other components.

Server(s) 12 may be configured to communicate with one or more client computing platforms 14 according to a client/server architecture, a peer-to-peer architecture, and/or other architectures. Components of system 100 may communicate over a network 13. Communication may use techniques including, but not limited to, wired, wireless, and/or combinations thereof. In some embodiments, two or more client computing platforms 14 may communication with each other according to a peer-to-peer architecture. Users may access system 100 and/or the virtual space via client computing platform(s) 14. Server(s) 12 may be configured to host the virtual space.

Server(s) 12 may include electronic storage 50, one or more processors 110, and/or other components. Server(s) 12 may include communication lines, or ports to enable the exchange of information with a network and/or other computing platforms. Illustration of server(s) 12 in FIG. 1 is not intended to be limiting. Server(s) 12 may include a plurality of hardware, software, and/or firmware components operating together to provide the functionality attributed herein to server(s) 12. For example, server(s) 12 may be implemented by a cloud of computing platforms operating together as server(s) 12.

Server(s) 12 may be configured to implement one or more instances of the virtual space. One of more users may interact with each other and an instance of the virtual space through individual expressions of the instance of the virtual space. Expressions may be implemented by client computing platforms 14 and/or server(s) 12. Individual client computing platforms 14 may implement individual expressions. Individual client computing platforms 14 may interact and/or communicate with server(s) over network 13. Client computing platforms 14 may be associated with users.

In some embodiments, server(s) 12, client computing platform(s) 14, and/or external resources 16 may be operatively linked via one or more electronic communication links. For example, such electronic communication links may be established, at least in part, via a network 13 such as the internet and/or other networks. It will be appreciated that this is not intended to be limiting, and that the scope of this disclosure includes embodiments in which server(s) 12, client computing platform(s) 14, and/or external resources 16 may be operatively linked via some other communication media.

External resources 16 may include sources of information, hosts and/or providers of virtual environments outside of system 100, external entities participating with system 100, and/or other resources. In some embodiments, some or all of the functionality attributed herein to external resources 16 may be provided by resources included in system 100.

Server(s) 12 may be configured to execute one or more computer program modules. The computer program modules may include one or more of a virtual space module 32, a user account module 34, an interface module 36, a transceiver module 38, and/or other modules.

The term "character" may refer to an object (or group of objects) present in the virtual space that represents an individual user, is controlled by an individual user, and/or is controlled by another source such as artificial intelligence, network resources, testing resources, and/or other sources. The user characters may include avatars. A given character associated with a given user may be controlled by the given user with which it is associated. In some embodiments, a given character may be associated with only one user at a time. In some embodiments, a character may be associated with two or more users such that each associated user can control different controllable aspects of the given character.

User account module 34 may be configured to access and/or manage one or more user profiles and/or user information associated with users of system 100. The one or more user profiles and/or user information may include information stored by server(s) 12, client computing platform(s) 14, and/or other storage locations. User profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

Virtual space module 32 may be configured to implement one or more instances of the virtual space executed by the computer modules to determine views of the virtual space. The views may be transmitted (e.g., via streaming, via object/position data, and/or other information) from server(s) 12 to client computing platform(s) 14 for presentation to users. Views transmitted to a given client computing platform 14 may correspond to a user character being controlled by a user via the given client computing platform 14. Views transmitted to a given client computing platform 14 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

An instance of the virtual space may comprise a simulated space that is accessible by users via clients (e.g., client computing platform(s) 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance implemented and/or executed by the computer modules may be synchronous, asynchronous, and/or semi-synchronous.

The description herein of the manner in which views of the virtual space are determined by virtual space module 32 is not intended to be limiting. Virtual space module 32 may be configured to express the virtual space in a more limited, or richer, manner. For example, views determined for the virtual space may be selected from a limited set of graphics depicting an event in a given place within the virtual space. The views may include additional content (e.g., text, audio, animations, video, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by virtual space module 32, users may control characters, objects, simulated physical phenomena (e.g., wind, rain, earthquakes, and/or other phenomena), and/or other elements within the virtual space to interact with the virtual space and/or each other. The user-controlled element(s) may move through and interact with the virtual space (e.g., non-user characters in the virtual space, other objects in the virtual space, etc.). The user-controlled elements controlled by and/or associated with a given user may be created and/or customized by the given user. The user may have an "inventory" of virtual goods and/or currency that the user can use (e.g., by manipulation of a user character or other user-controlled element, and/or other items) within the virtual space.

Interface module 36 may be configured to generate and/or present user interfaces to users. User interfaces may be presented on client computing platforms 14 to users. User interfaces may be user-specific. Users may interact with an instance of the virtual space and/or server(s) 12 through user interfaces. In some embodiments, users may interact with other users through user interfaces. Interaction may include communications such as one or more of textual chat, instant messages, private messages, voice communications, video communications, and/or other communications.

Transceiver module 38 may be configured to receive and/or transmit information regarding objects in an instance of the virtual space. Transceiver module 38 may be configured to transmit and/or share current states and/or significant edges for objects to client computing platforms 14, as well as other information needed to recreate how objects arrived at their current position. Client computing platforms 14 may use transmitted and/or shared information to determine views and/or behavior of objects in the local expression of the instance of the virtual space on a particular client computing platform. Transceiver module 38 may be configured to receive current states and/or significant edges for objects from client computing platforms 14, as well as other information needed to recreate how objects arrived at their current position. A client computing platform 14 may locally determine a state of an object, e.g. an object under user control, and transmit information for that object to server(s) 12 and/or share information with other client computing platforms 14.

In some embodiments, various aspects of a character may be controlled by different sources. For example, for a given character, one controllable aspect may be controlled by a first user, another controllable aspect may be controlled by a second user, and yet another controllable aspect may be controlled by artificial intelligence. The controlling entity of an object may be referred to as the point of control. The object controlled at the point of control may be referred to as the master object.

Controllable aspects of a given character may include one or more of locomotion of the given character, a gesture performable by the given character, a field of view of the given character, a bodily motion of the given character, actions performable by the given character, equipping the given character with a tool and/or weapon, using an equipped tool and/or weapon, initiating an interaction (e.g., coupling) between the given character and another character, playing audio and/or visual effects associated with an action performed by the given character, and/or other controllable aspects. To illustrate, direction of travel of a vehicle carrying two user characters may be controlled by a first user, a weapon mounted on the vehicle may be controlled by the second user, and reactions to terrain may be controlled by artificial intelligence. By virtue of the disclosure herein, objects may be synchronized across different implementations of the virtual space and/or between different points of control.

Behavior and/or action of objects may be implemented using behavior trees. Behavior trees may include nodes that correspond to different states of the objects. Behavior trees may include edges that correspond to transitions between nodes. An individual behavior tree may be used for an individual object. A complex action for an object may be implemented by a sequence of nodes within a behavior tree. A sequence may include one or more transitions between different nodes. For example, when a character performs a jump, such an action may be implemented by a sequence of nodes going from lift-off, via hang-time, to landing. For complex objects, multiple components may act (at least somewhat) independently. For example, the legs, torso, arms, and head of a character may have a range of possible motions/actions during a particular action such as a jump. Arms could flail, hold, drop, or use a weapon, reload, cast a spell, etc. The head could tilt in different directions, have different expressions, etc. The landing may be standing up straight, crouching, rolling, etc. In some embodiments, an object may have multiple concurrently active nodes within a behavior tree such that individual nodes correspond to different components within the object. Within a sequence of nodes, some nodes may be more significant than other nodes. For example, the first node of a particular action, such as a jump, may contain all or much of the information needed to determine important aspects of the action, such as the expected location of a character after the jump is completed. As a result, intermediate nodes between the first node and the last node of a particular action may be less significant than the first node.

Figure 2:
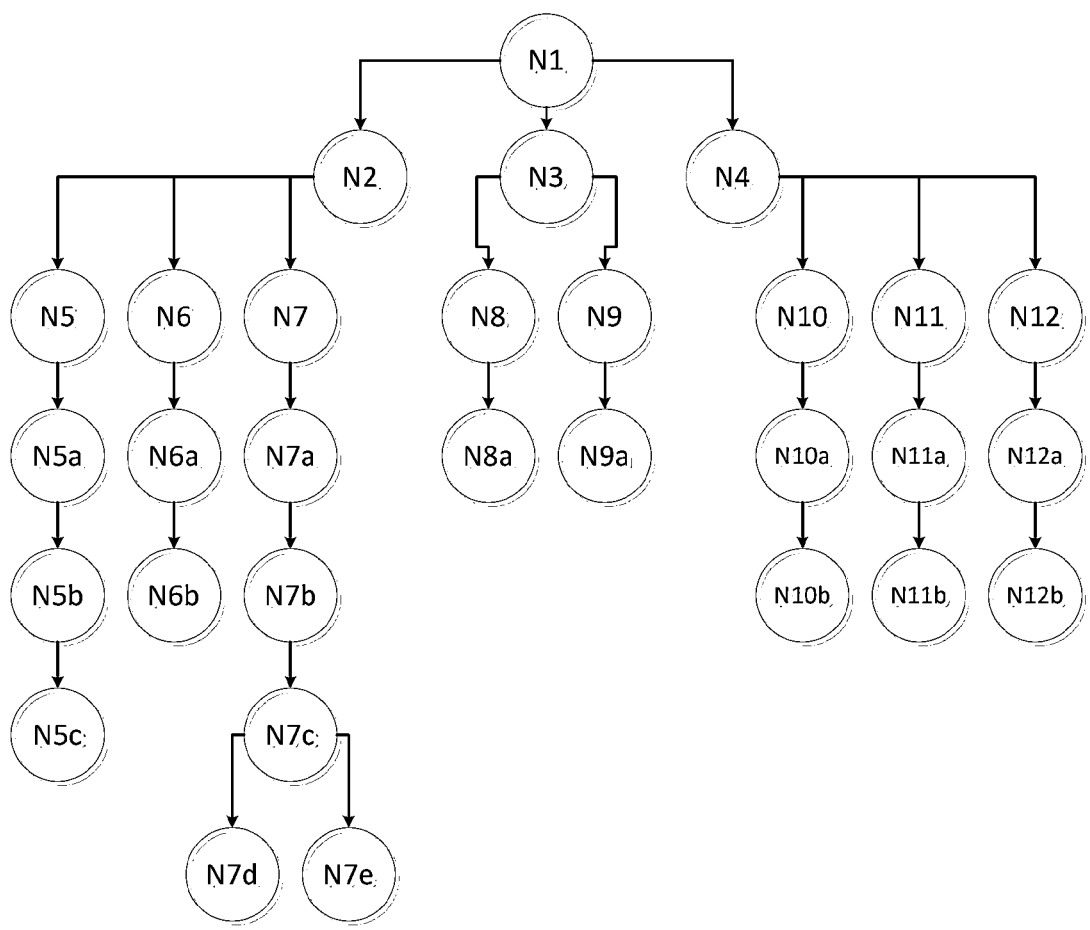
FIG. 2 illustrates an example of a behavior tree of an object, in accordance with one or more embodiments.

By way of non-limiting example, FIG. 2 illustrates a behavior tree 20 for an object. Behavior tree 20 includes nodes labeled "N" with a number or designation affixed to it. Behavior tree 20 includes significant nodes and non-significant nodes. By sharing some of the nodes, e.g. the significant nodes, among different users, players, or client computing platforms, the bandwidth requirements may be contained within practical limits. The object corresponding to behavior tree 20 may be a complex object that includes three components or parts, labeled N2, N3, and N4. These may act (at least somewhat) independently. For example, the complex object may be a character. The legs, arms, and head of the character may form independent parts of the character. The section of behavior tree 20 that corresponds to these components or parts may be referred to as sub-trees. As depicted, sub-tree N2 may include three different complex actions or sequences of nodes, labeled N5, N6, and N7. Sub-tree N3 may include two different complex actions or sequences of nodes, labeled N8 and N9. Sub-tree N4 may include three different complex actions or sequences of nodes, labeled N10, N11, and N12.

As depicted in FIG. 2, individual actions or sequences of nodes, here labeled N5-N12, may include additional subsequent nodes. These nodes may be used to implement complex actions and/or complex behavior. For example, node N6 may progress to node N6a and/or N6b. FIG. 2 may not depict all possible or available transitions between nodes for simplicity. An action for the object may involve one or more of the sub-trees. For example, a complex action may be a jump of a character. The legs, arms, and head of the character may perform different sequences within behavior tree 20. Depending on interaction with the user and/or other objects, a complex current state within behavior tree 20 may be described as a set of currently active nodes, for example (N5b, N9a, N12), (N7c, N8, N11b), and so forth. Particular progress within a behavior tree may be referred to as a traversal. In some implementations, traversal in a behavior tree may include probability. For example, the next state after node N7c can be either N7d or N7e, and the determination may be left to chance. For example, an incoming projectile may or may not hit an object, and the chance of hitting may be, for example, 20%. The behavior (and/or node or traversal) after a hit may be different from the behavior, if any, after a miss. The determination of such probabilities (e.g. the result of the 20% chance) may be made for the master object. Behavior trees may allow many different traversals. Since an object may be part of different implementations of the virtual space, there may be a need to synchronize such progress within individual behavior trees. Once a probability has been resolved or determined for the master object, other implementations of the same object need to receive information about that result. In other words, such probabilities are not resolved independently for different implementations. Rather, a hit or miss needs to be the same in different implementations. In some implementations, information needed to recreate how an object arrived at its position includes results of probabilities. In some implementations, such information is stored in (or associated with) significant edges. Note that the number of nodes, sub-trees, sequences and other particulars of behavior tree 20 are merely exemplary and not intended to be limiting in any way.

Returning to FIG. 1, users may participate in the virtual space by controlling one or more of the available user-controlled elements of objects in the virtual space. Control may be exercised through control inputs and/or commands input by the users through client computing platform(s) 14. By way of illustration, input from users may be entered using interface devices including, but not limited to, a keypad, buttons, switches, a keyboard, knobs, levers, a display screen, a touch screen, speakers, a microphone, an indicator light, an audible alarm, and a printer.

A client computing platform 14 may include one or more processors 110, electronic storage 50, and/or other components. Client computing platform 14 may include communication lines, or ports to enable the exchange of information with a network and/or other computing platforms. The one or more processors 110 may be configured to execute computer program modules. The computer program modules may include one or more of a space module 22, a reception module 24, a behavior module 26, a synchronization module 28, a sequence module 30, and/or other modules. The computer program modules may be configured to enable a player, expert, and/or user associated with client computing platform 14 to interface with system 100, server(s) 12, and/or external resources 16, and/or provide other functionality attributed herein to client computing platform(s) 14. By way of non-limiting example, client computing platforms 14 may include one or more of a desktop computer, a laptop computer, a handheld computer, a NetBook, a tablet, a Smartphone, a gaming console, and/or other computing platforms.

Space module 22 may be configured to implement an expression of an instance of the virtual space. The virtual space may include one or more objects. Space module 22 may be configured to determine views of the virtual space. Determined views may include depictions and/or representations of actions and/or behavior of objects. Actions and/or behavior of objects may be implemented using behavior trees. Client computing platforms may locally have access to and/or control over one or more behavior trees of one or more objects in the local expression of the instance of the virtual space.

In some embodiments, space module 22 of a client computing platform 14 may communicate with one or more modules of server(s) 12 that host an instance of the virtual space. By way of non-limiting example, space module 22 may communicate and/or interact with virtual space module 32 of server(s) 12.

Reception module 24 may be configured to receive shared information regarding objects. Server(s) 12 may host the instance. Reception module 24 may receive information over one or more networks, e.g. network 13. Reception module 24 may receive current states and/or significant edges for objects over a network, as well as other information needed to recreate how objects arrived at their current position. Reception module 24 may receive information regarding behavior trees of objects within the instance of the virtual space, and, in particular, information pertaining to the local expression of the instance of the virtual space. Received information for objects may originate from (e.g. be shared by) one or more points of control. In some implementations, shared states correspond to significant (and currently active) nodes in the behavior tree of an object. Reception module 24 may receive a current state for a first object, e.g. from server(s) 12. Reception module 24 may receive a current state for a second object, e.g. from a client computing platform 14 that implements an expression of the instance of the virtual space. For example, multiple users may independently control multiple characters in the same virtual area within the instance of the virtual space. In some embodiments, communication between different client computing platforms 14 may be directed and/or routed through server(s) 12.

In some embodiments, the information received by reception module 24 may include timing information, e.g. timestamps. Timestamps may correspond to a particular point in time. The time may pertain or relate to the real world or to the virtual world of a game. The received current states for objects may include one or more timestamps.

Behavior module 26 may be configured to determine subsequent states of objects. In some implementations, determined states correspond to non-significant nodes in the behavior tree of an object. Behavior module 26 may be configured to determine subsequent nodes within individual behavior trees for individual objects. Determinations by behavior module 26 may be based on probabilities or chance. Determinations by behavior module 26 may be based on shared information, e.g. received states as received by reception module 24. Alternatively, and/or simultaneously, determinations by behavior module 26 may be based on the behavior trees of objects, and/or other information. Behavior module 26 may be configured to determine subsequent states of objects. Behavior module 26 may be configured to determine a (predetermined) sequence of states of an object. Behavior module 26 may determine subsequent nodes within individual behavior trees for individual objects. Determinations by behavior module 26 may be based on the received current states. Determinations by behavior module 26 may be based on the behavior trees for the objects. In some embodiments, actions of objects may be implemented as predetermined sequences of states. Individual actions may correspond to traversals spanning multiple nodes of individual behavior trees. Determinations by behavior module 26 may need to be shared with other implementations of the virtual space. For example, determinations of probabilities may need to be shared.

Operation of behavior module 26 may be responsive to receipt of current states for objects by reception module 24. Behavior module 26 may be configured to determine timing information, e.g. timestamps, that corresponds to one or more determined states. Alternatively, and/or simultaneously, behavior module 26 may be configured to determine timing information that corresponds to a sequence of states of an object.

Synchronization module 28 may be configured to synchronize states of objects that are locally determined (by a particular client computing platform) with the received states for those objects, as shared by one or more points of control. Synchronization module 28 may determine and/or verify whether locally determined states are synchronized with received states. Synchronization module 28 may be configured to determine whether objects of an expression of an instance of the virtual space are up-to-date in comparison to counterparts of the objects in other implementations of the virtual space.

In some implementations, synchronization module 28 may compare all or most of the active states of an object to verify synchronization status. Such an approach may not be practical, e.g. in terms of bandwidth requirements. In some implementations, synchronization module 28 may compare fewer states of an object to verify synchronization status. For example, synchronization module 28 may limit such verification to signification nodes and/or shared states. Synchronization module 28 may be configured to verify synchronization status based on less information than needed to synchronize an object. In some implementations, once an object has been verified as out-of-sync, additional information may be shared as needed to synchronize the object.

In some implementations, when a user joins a game in progress, this situation may be treated akin to an object being out-of-sync. The remedy is similar to the described procedure for occurrences of any object being out-of-sync.

In some implementations, the shared information required for such a remedy includes significant nodes, significant edges, and/or other information needed to recreate how the master object arrived at its current position.

Determinations by synchronization module 28 may be based on timing information. For example, a determination may be based on a comparison of one or more timestamps that correspond to a received current state for an object and one or more timestamps that correspond to a determined (subsequent) state of an object. The comparison may pertain to the same object. Comparisons may be based on sets of currently active nodes as described in relation to behavior trees. For example, referring to FIG. 2, if the received current state, i.e. the set of currently active nodes, is (N7c, N8, N11b) and the locally determined state, i.e. set of currently active nodes, is (N7b, N8, N11a), this may indicate the local object is out-of-sync. The assumption is that the timestamps of both states correspond to the same (or similar) point in time. Due to a variety of reasons, the locally determined state may lag or trail compared to the latest state for this object.

Referring to FIG. 1, sequence module 30 may be configured to determine a sequence of one or more subsequent states for an object. Operation of the sequence module may be responsive to a determination, e.g. by synchronization module 28, that an object is not synchronized, e.g. out-of-sync. The determined sequence may be such that at the end of the sequence the object will be synchronized with one or more other objects as appropriate.

In some embodiments, the determined sequence may include a similar traversal as one or more behavior trees in other implementations of the virtual space. In such embodiments, the timing information pertaining to the determined traversal may be compressed or expanded to accomplish and/or restore synchronization. By virtue of accomplishing and/or restoring synchronization gradually over multiple nodes of a behavior tree, the resulting action may seem smooth, fluent, and/or natural, rather than abrupt, and/or unnatural.

In some embodiments, the determined sequence may include a different traversal to accomplish synchronization. For example, the determined sequence may skip a non-critical node/state in order to catch up and restore synchronization. By virtue of determining an alternative sequence spanning multiple nodes of a behavior tree, the resulting action may seem smooth and fluent, rather than abrupt, or unnatural. In some embodiments, behavior trees may include sub-trees and/or alternate sequences specifically for the purpose of restoring synchronization if needed. For example, a particular gesture may be implemented by multiple different sequences within a behavior tree for this purpose.

Space module 22 may be configured to determine views of an object in an expression of an instance of the virtual space based on multiple subsequent nodes. Determinations may interpolate between two or more subsequent nodes. Determinations may extrapolate from one or more nodes. For example, in completing an action or gesture, different nodes may correspond to different bodily positions included in that action or gesture. Space module 22 may be configured to determine intermediate views to connect smoothly different nodes by extrapolating and/or interpolating information from multiple nodes.

Server(s) 12 and client computing platform(s) 14 may include electronic storage 50. Electronic storage 50 may comprise electronic storage media that electronically stores information. The functionality of electronic storage 50 may be similar between different instantiations, even if the stored information may be different. Electronic storage 50 may be configured to store behavior trees for objects in a virtual space. Behavior trees may include nodes that correspond to states of objects. Individual behavior trees may correspond to individual objects. The electronic storage media of electronic storage 50 may include one or both of system storage that is provided integrally (i.e., substantially non-removable) and/or removable storage that is removably connectable to server(s) 12 and/or client computing platform(s) 14 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 50 may include one or more virtual storage resources (e.g., cloud storage, a virtual private network, and/or other virtual storage resources). Electronic storage 50 may store software algorithms, information determined by processor(s) 110, information received from components of system 100, and/or other information that enables server(s) 12 and/or client computing platform(s) 14 to function as described herein.

Server(s) 12 and client computing platform(s) 14 may include processor(s) 110. Processor(s) 110 may be configured to provide information processing capabilities in server(s) 12 and/or client computing platform(s) 14. The functionality of processor(s) 110 may be similar between different instantiations, even if the processing capabilities may be different. Processor(s) 110 may include one or more of a digital processor, an analog processor, a digital circuit designed to process information, an analog circuit designed to process information, and/or other mechanisms for electronically processing information. Although processor(s) 110 is shown in FIG. 1 as a single entity, this is for illustrative purposes only. In some embodiments, processor(s) 110 may include a plurality of processing units. These processing units may be physically located within the same device, or processor(s) 110 may represent processing functionality of a plurality of devices operating in coordination. The processor(s) 110 may be configured to execute modules 22-38, and/or other modules. Processor 110 may be configured to execute modules 22-38, and/or other modules by software; hardware; firmware; some combination of software, hardware, and/or firmware; and/or other mechanisms for configuring processing capabilities on processor(s) 110.

It should be appreciated that although modules 22-38 are illustrated in FIG. 1 as being co-located within two processing units, one or more of modules 22-38 may be located remotely from the other modules. The description of the functionality provided by the different modules 22-38 described below is for illustrative purposes, and is not intended to be limiting, as any of modules 22-38 may provide more or less functionality than is described. For example, one or more of modules 22-38 may be eliminated, and some or all of its functionality may be provided by other ones of modules 22-38. As another example, processor 110 may be configured to execute one or more additional modules that may perform some or all of the functionality attributed herein to one of modules 22-38.

It is noted that the division of functionality between server(s) 12 and client computing platform(s) 14 is not intended to be limited by this disclosure. Functions described in relation with server(s) 12 may be performed and/or shared by one or more other components of system 100, including client computing platform(s) 14, and vice versa.

Figure 3:
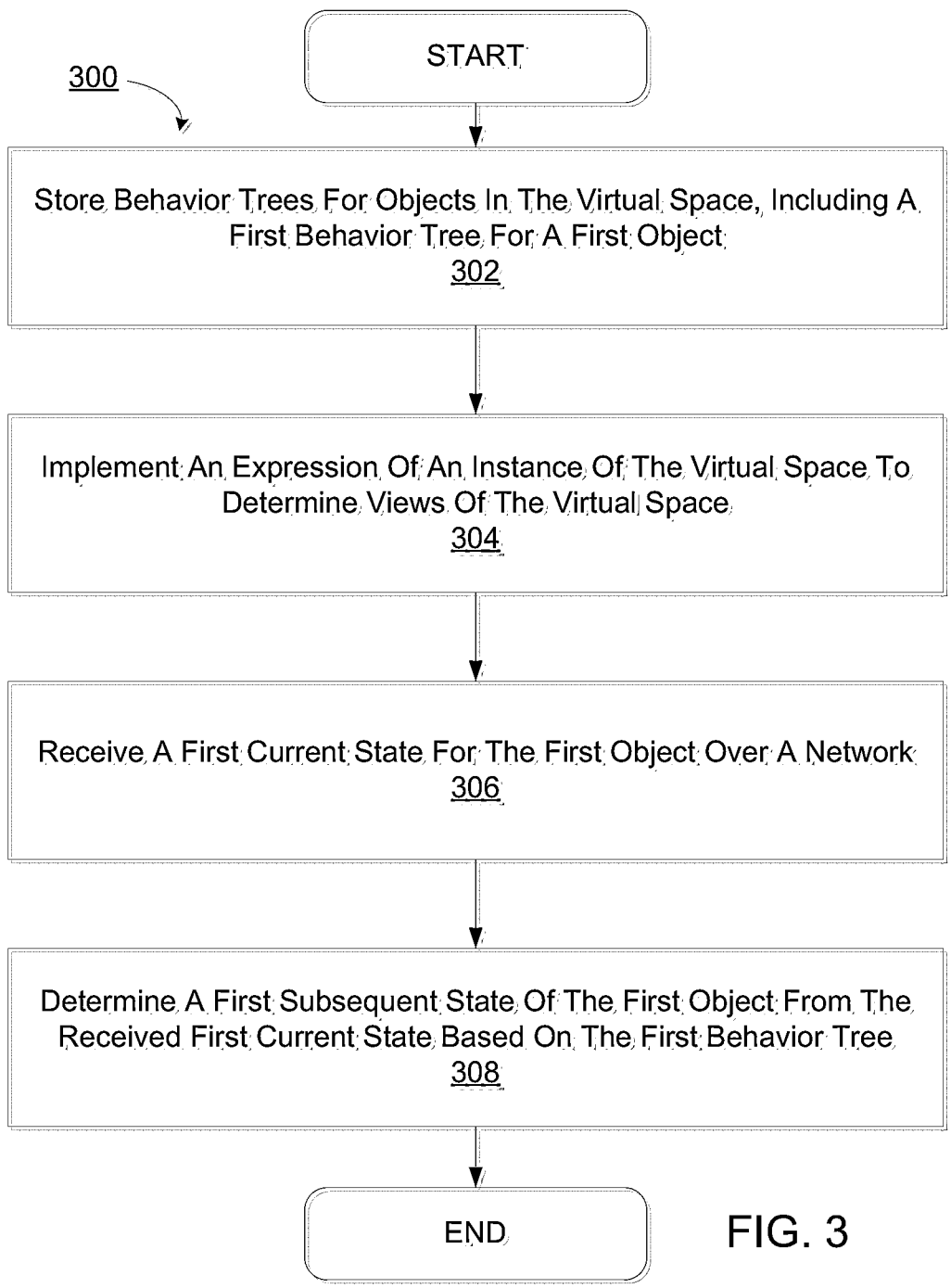
FIG. 3 illustrates a method for synchronizing objects in a virtual space, in accordance with one or more embodiments.

FIG. 3 illustrates a method 300 for synchronizing objects in a virtual space, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, behavior trees are stored for objects in the virtual space, wherein individual behavior trees include nodes that correspond to states of the objects, wherein the behavior trees include a first behavior tree for a first object. In some embodiments, operation 302 is performed by an electronic storage the same as or similar to electronic storage 50 of client computing platform 14 (shown in FIG. 1 and described herein).

At an operation 304, an expression of an instance of the virtual space is implemented to determine views of the virtual space, wherein the objects include the first object. In some embodiments, operation 304 is performed by a space module the same as or similar to space module 22 (shown in FIG. 1 and described herein).

At an operation 306, a first current state is received for the first object over a network. In some embodiments, operation 306 is performed by a reception module the same as or similar to reception module 24 (shown in FIG. 1 and described herein).

At an operation 308, a first subsequent state of the first object is determined from the received first current state based on the first current state and the first behavior tree. In some embodiments, operation 308 is performed by a behavior module the same as or similar to behavior module 26 (shown in FIG. 1 and described herein).

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to synchronize objects in a virtual space, the system comprising:
   a client computing platform associated with a user of the virtual space, the client computing platform comprising:
      electronic storage that stores behavior trees for objects in the virtual space, wherein individual behavior trees include nodes that correspond to states of the objects, the states of the objects describing behaviors of the objects within the virtual space, wherein the electronic storage is configured to store a first behavior tree for a first object; and
      one or more physical processors configured by machine-readable instructions to:
         implement an expression of an instance of the virtual space to determine views of the virtual space, the determined views including depictions and/or representations of the behaviors of the objects, and wherein the objects in the virtual space include the first object;
         receive current states for the objects over a network, the current states describing current behaviors of the objects in the virtual space; and
         determine subsequent states of objects from the received current states based on the behavior trees stored at the client computing platform, the subsequent states describing subsequent behaviors of the objects in the virtual space, such that responsive to reception of a first current state describing a first behavior of the first object in the expression of the instance of the virtual space, determine a first subsequent state for the first object, the first subsequent state for the first object being determined based on the first current state and the first behavior tree, the first subsequent state describing a second behavior of the first object in the expression of the instance of the virtual space.

2. The system of claim 1, wherein the one or more physical processors are further configured by machine-readable instructions to synchronize determined subsequent states of the objects with received current states for the objects.

3. The system of claim 2, wherein the first subsequent state is for a first point in time, and wherein the one or more physical processors are further configured by machine-readable instructions to, responsive to reception of a second current state for the first object for a second point in time that corresponds to the first point in time, determine whether the first object is synchronized by comparing the first subsequent state with the second current state.

4. The system of claim 3, wherein the one or more physical processors are further configured by machine-readable instructions to determine, responsive to a determination that the first object is not synchronized, a sequence of one or more subsequent states of the first object such that the first object will be synchronized at an end of the sequence.

5. The system of claim 4, wherein the determined sequence of one or more subsequent states of the first object is different than a sequence of received current states for the first object.

6. The system of claim 4, wherein timing of the determined sequence of one or more subsequent states of the first object is different than timing of a sequence of received current states for the first object.

7. The system of claim 3, wherein the received current states include timestamps, and wherein determinations of synchronization are based on comparisons of timestamps.

8. The system of claim 1, wherein actions of objects are implemented as predetermined sequences of states such that individual actions correspond to traversals spanning multiple nodes of the individual behavior trees.

9. The system of claim 8, wherein actions of objects are further implemented by interpolation between the multiple nodes.

10. The system of claim 1, wherein the electronic storage is configured to store individual behavior trees for individual objects.

11. The system of claim 1, wherein a current state of an individual object corresponds to multiple nodes within a single behavior tree.

12. The system of claim 11, wherein the received first current state corresponds to multiple nodes within the first behavior tree.

13. The system of claim 1, wherein the expression of the instance of the virtual space is associated with a first user.

14. The system of claim 13, wherein the current states for the objects are received from a second expression of the instance of the virtual space, wherein the second expression is associated with a second user.

15. The system of claim 1, wherein the first current state for the first object is received from a non-player character (NPC).

16. A computer-implemented method for synchronizing objects in a virtual space, the method being implemented in a client computing platform associated a user of a virtual space, the client computing platform including one or more physical processors and electronic storage storing machine-readable instructions, the method comprising:

storing, in the electronic storage of the client computing platform, behavior trees for objects in the virtual space, wherein individual behavior trees include nodes that correspond to states of the objects, the states of the objects describing behaviors of the objects within the virtual space, wherein the behavior trees include a first behavior tree for a first object;

implementing an expression of an instance of the virtual space to determine views of the virtual space, the determined views including depictions and/or representations of the behaviors of the objects, and wherein the objects include the first object;

receiving a first current state for the first object over a network, the first current state describing a first behavior of the first object in the expression of the instance of the virtual space; and determining a first subsequent state of the first object from the received first current state based on the first current state and the first behavior tree, the first subsequent state describing a second behavior of the first object in the expression of the instance of the virtual space.

17. The method of claim 16, wherein the determined first subsequent state is for a first point in time, the method further comprising:

receiving a second current state for the first object that is for a second point in time, wherein the second point in time corresponds to the first point in time; and determining whether the first object is synchronized by comparing the determined first subsequent state with the received second current state.

18. The method of claim 17, further comprising:

determining, responsive to a determination that the first object is not synchronized, a sequence of one or more subsequent states of the first object such that the first object will be synchronized at an end of the sequence.

19. The method of claim 16, further comprising:

implementing actions of objects as predetermined sequences of states, such that individual actions correspond to traversals spanning multiple nodes of the individual behavior trees.

20. The method of claim 16, wherein the received first current state corresponds to multiple nodes within the first behavior tree.

* * * * *